INVENTOR
GEORGE H. ENNIS
BY Fred W Lawie
ATTORNEY.

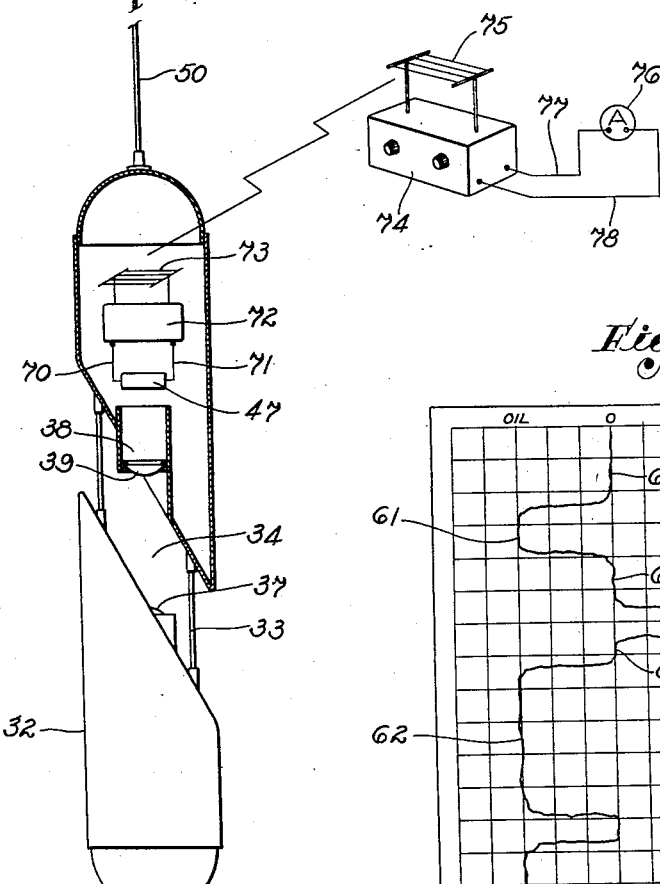

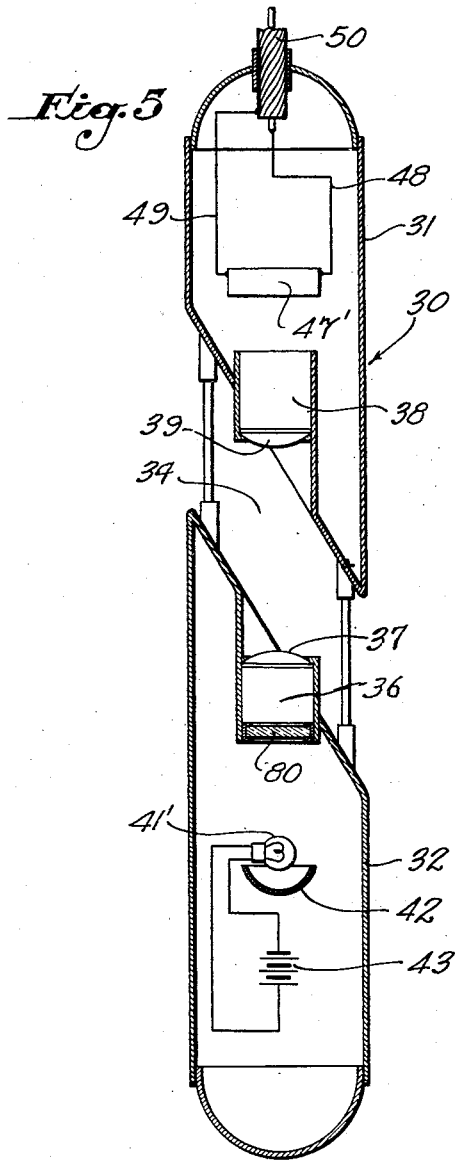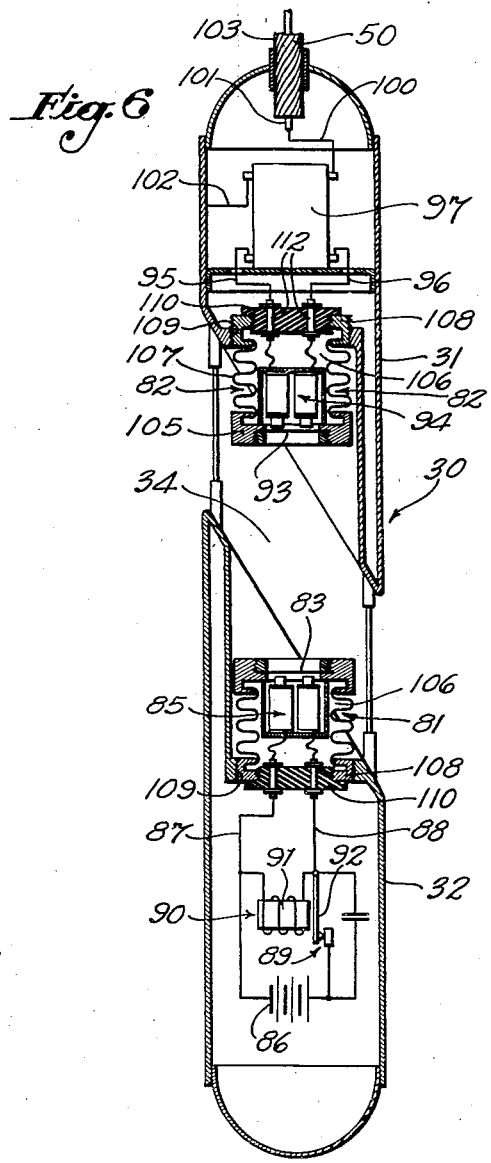

Patented May 19, 1942

2,283,429

UNITED STATES PATENT OFFICE 2,283,429

METHOD OF AND APPARATUS FOR DETERMINING THE LOCATION OF WATER STRATA IN WELLS

George H. Ennis, Long Beach, Calif., assignor of one-half to Robert V. Funk, Long Beach, Calif.

Application December 17, 1934, Serial No. 757,898

11 Claims. (Cl. 73—51)

My invention relates to the testing of a well for the purpose of determining the point or points at which liquid, such as water or oil, enters the well, and particularly relates to a new and improved method for making such determination.

In the drilling of an oil well it invariably occurs that water bearing strata are penetrated before reaching the oil sands. Furthermore, it sometimes occurs that between a number of oil sands there exists a water bearing strata. It is highly desirable to seal from the well the water bearing formations since the presence of water in the well will result in the formation of an emulsion and in some instances will reduce the oil yield of the well to the extent that the operation of the well is impractical.

It is an object of my invention to provide a method of determining the point at which fluid enters a well, in which the physical characteristics of the fluid in the well are measured.

The water may enter the well either solely as water, as an oil-in-water emulsion, or as a water-in-oil emulsion. Where the fluid entering the well is a water-in-oil emulsion, which because of the insulation effect of the oil is a non-conductor of electricity, a correct determination of the point of entrance of the water cannot be determined by the electrical methods in use unless a sample of the fluid is taken from the well at the critical point.

It is an object of my invention to provide a method and apparatus whereby the point of entrance of water, oil-in-water emulsion, or water-in-oil emulsion may be determined.

It is a further object of my invention to determine the point of leakage or entrance of a fluid into a well by measuring the vibration or wave transmitting characteristics of the fluid in the well. It is within the scope of my invention to measure the light, sound, or heat transmitting characteristics of the material in the well in order to determine where the fluid leaks into or enters the well.

It is a further object of my invention to provide an apparatus whereby the light transmitting qualities of a material in a well may be measured.

Usually where tests are required it is the desire to locate the point at which water or saline solutions enter the well. However, it may be necessary or desirable to determine the exact point where the oil is entering the well and for this reason my present invention is referred to as a method for determining the points at which fluid enters a well.

Different fluids, substances, or mixtures have different light transmitting qualities, and I take advantage of this fact in the performance of my process. Ordinarily my process involves the following steps: First, the well is prepared for making the tests. This preparatory step consists in giving the fluid content in the well the desired color or light transmitting characteristics such as by placing in the well what I term a "charging material." This charging material may be placed throughout the entire well or at such a point where the log of the well indicates a possible point where leakage has occurred. This charging material is preferably one which, as far as light transmitting qualities or characteristics are concerned is substantially half way between water and oil. I prefer this type of charging material, although I do not wish to be limited to it, because in this way the readings which are obtained will clearly indicate whether the leakage into the well is oil or water. Another method of preparing the well is to treat the fluid already in the well to give it the desired light transmitting qualities. This may be done such as by lowering a chemical or coloring pigment into the well.

After the well has been thus prepared I then perform the step of the process which enables the leakage to occur. This step is accomplished by removing a portion of the material from the upper end of the well, thus lowering the liquid level to a point below its normal liquid level. When this occurs additional fluid will flow into the well at the points where the leakages exist or at the points where a water bearing formation or an oil bearing formation is located. When this fluid enters the well it will change the light transmitting characteristics of the charging material, and if sufficient fluid flows into the well it will completely replace the charging material at those points directly opposite the point where the fluid flows into the well.

The next step of the process consists in measuring the vibration transmitting characteristics of the material in the well. This step of my invention is preferably accomplished by use of a device which includes a vibration transmitting means and a vibration receiving means. In the preferred form of my invention the vibration transmitting means is in the form of a light source and the vibration receiving means is in the form of a light responsive element, such as a photo-electric or selenium cell. The two elements referred to are spaced apart predetermined distances to provide a space for the material in the well to enter and readings are taken at various points in the well. Where water has flowed into the well more light will be transmitted and the reading obtained will indicate the passage of water into the well at that point. Where oil has leaked into the well less light will be transmitted and the reading obtained will indicate the point at which oil flows into the well.

My invention comprehends different methods of recording or reporting the qualities of the material in the well and may be done either electrically, photographically, or by the use of a radio transmission mechanism, as will be pointed out when the details of the invention are explained.

Furthermore, my invention is adapted for making tests either in wells where the casing has already been installed or in what is known as "open wells" which are those wells in which the casing has not yet been installed in place.

Other objects and advantages of my invention will be pointed out in the following detailed description of my invention.

Referring to the accompanying drawings:

Fig. 3 is a view similar to Fig. 2 illustrating an alternative form of my invention which utilizes radio transmission apparatus for recording the characteristics of the material in the well.

Fig. 4 is a fragmentary view of a chart made from readings obtained in testing the well illustrated in Fig. 1.

Fig. 5 is a diagrammatic sectional view showing a form of device which may be used in the practice of my invention having means for transmitting vibration in the form of heat rays.

Fig. 6 is a diagrammatic sectional view showing another form of device for use in practice of the invention wherein the energy transmitted through the fluid in the well constitutes sound vibrations.

Figures 1, 2:
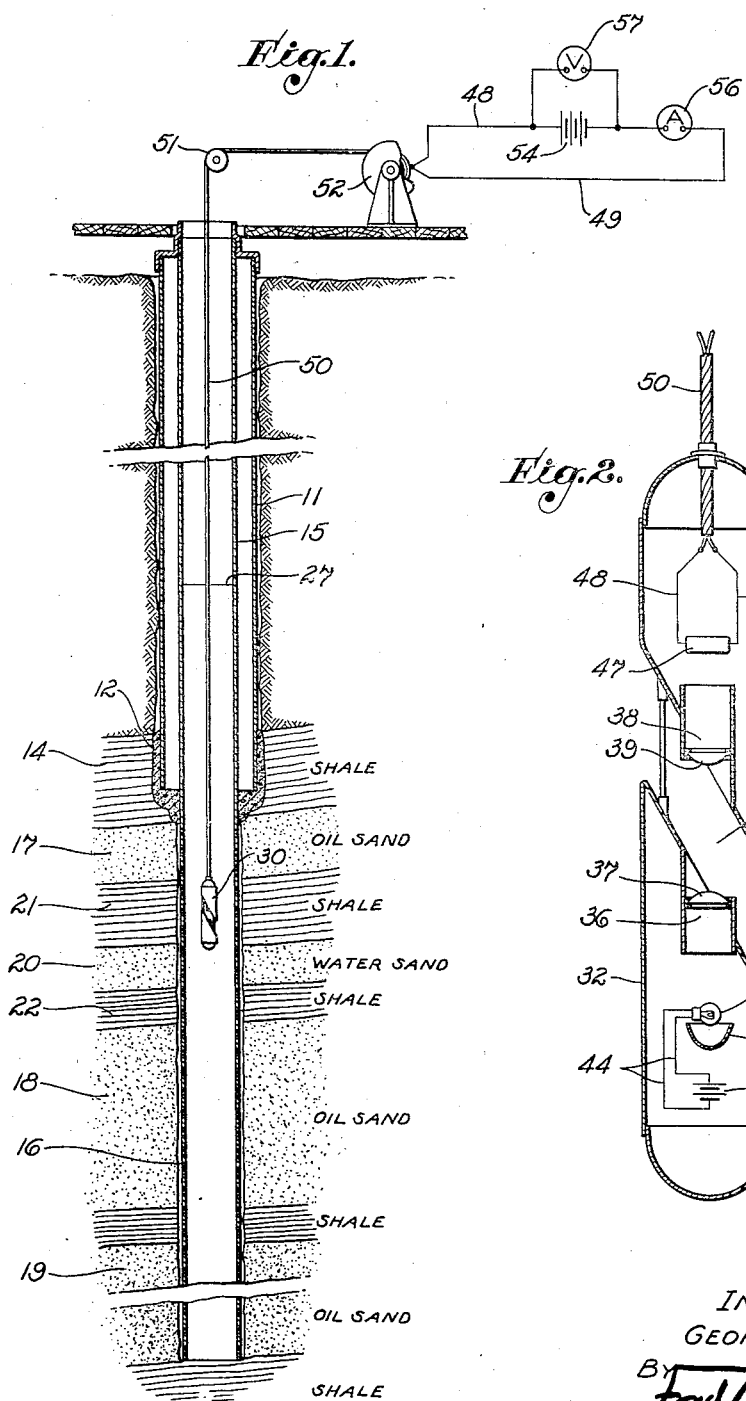
Fig. 1 is a diagrammatic view illustrating a portion of the apparatus whereby my process is performed.
Fig. 2 is a diagrammatic sectional view showing a form of device which may be used in the practice of my invention for measuring the vibration or light transmitting qualities of the material in the well.

Referring to Fig. 1, I have illustrated a well in which a casing has already been installed. It should be understood, however, that in the course of the following description the process will be substantially the same even though the casing has not yet been installed in the well. The numeral 11 represents the well casing which, according to usual practice, has been cemented at a point 12 to a layer of shale 14. This practice is followed in order to seal from the well the formations above the shale 14. Placed within the well casing 11 is an oil string 15 having a strainer or screen pipe 16 attached to or forming a part of its lower end. This strainer 16 extends downwardly through the oil bearing formations and it is through this strata that the oil enters the well and is thereafter pumped to the surface of the ground by well known pumping apparatus. The numerals 17, 18 and 19 represent oil sands which contain oil which will flow through the strainer 16 into the well. The numeral 20 represents a small water sand which is situated between layers of shale 21 and 22. In the well illustrated, in setting the casing the presence of the water sand 20 was not discovered and upon operation of the well it was found that water was present in the oil. It thereupon became necessary to make a further investigation to determine the point of entrance of this water and to seal it from the casing. Under these set of facts which have been found to exist in actual oil practice, the process of my invention is performed in the following manner.

The first step of the process is to prepare the well for additional steps of the process. This preparatory step is usually performed by placing a charge of what I will term a "charging material" in the well. This charging material is preferably of a mixture of water and some substance, such as coloring pigments, which produces a charging material which will transmit less light than is transmitted by water and more light than by oil. This step may be performed in one of a number of well known methods. The charging material may be placed in the well by the use of a bailer which may be lowered into the well to a given point where its charge will be released. Another method is to extend a pipe into the well to a suitable position and then to pump the charging material through this pipe and into the well at the desired location. If the approximate location of the water leakage is known, it is not necessary to fill the entire well with the charging material but it is only necessary to place the charging material at the vital point. However, if the point of leakage is not known, then it may be desirable to distribute the charging material throughout the entire well. Other means of preparing the well, as already pointed out, may be used if desired.

After the well has been thus prepared the next step in the process is to cause the water to flow into the well at the leakage point. This is done by bailing the liquid from the upper end of the well so as to lower the liquid level from its normal level, such as is indicated by the numeral 27, in order that fluid will flow into the well to bring the same back to its normal or static condition. When the level of the well is thus lowered water will flow into the well from the water sand 20. Also, oil will flow into the well through the various oil sands.

The next step in the process consists of measuring the light transmitting qualities or characteristics of the material in the well at each point throughout either the entire well or throughout the vital area if the vital area is known, as previously pointed out.

In order to perform this step I have developed apparatus which is illustrated in Fig. 2. This apparatus consists of a body 30 having an upper shell 31 and a lower shell 32. These two shells are connected together by frame members 33, and between the two shells 31 and 32 there is a space 34 which is inclined, as illustrated, in order that when the device is lowered into the well the material will flow through this space without causing any great disturbance.

In the lower shell there is a light transmitting aperture 36 which is provided with a window or light condenser 37. In direct alignment with the aperture 36 and condenser 37 there is provided an aperture 38 and light condenser 39 which form a part of the upper shell 31. Situated in the lower shell 32 is a light source 41 which may have a reflector 42 placed behind it in order that the light will be reflected toward the aperture 36. This light source 41 is preferably energized by a battery 43 which is connected to the light source 41 by circuit wires 44.

It will be seen, therefore, that the light produced by the light source 41 is directed toward the aperture 36 and will pass through the condenser 37 and light rays will be passed upwardly therefrom in substantially a straight shaft and will thereafter pass through the condenser 39 and aperture 38. Situated in the upper shell 31 is a light sensitive element 47 which may be a photo-electric cell, selenium cell, or any other equivalent device which is affected by the amount or intensity of light which comes into contact with it. The light sensitive element 47 is connected by conductors 48 and 49 to apparatus at the surface of the ground. These two conductors 48 and 49 are preferably carried within a suspension cable 50 which, as shown in Fig. 1, extends into the well and serves as a means whereby the body 30 may be raised or lowered. The cable 50 extends over a guide sheave 51 and is carried by a drum 52. The conductors 48 and 49 are connected in circuit with a battery 54 and an ammeter 56. There may also be provided, if desired, a voltmeter 57.

In performing this step of my invention the body 30 is lowered into the well and measurements of the light transmitting characteristics are taken at different levels. It is quite obvious from an inspection of Fig. 2 that the amount of light which is transmitted from the light source 41 to the light sensitive element 47 depends upon the light transmitting qualities of the material which is within the space 34. Since the light sensitive element 47 is affected by the amount of light which passes to it, it will be seen that the flow of current through the circuit comprising the conductors 48 and 49 is changed in accordance with the light transmitting characteristics of the material in the space 34. In performing this step the light transmitting characteristics of the charging material may be known and the operator will know what reading will be given on the ammeter 56 when the material in the space 34 is the charging material. When the material in the space is water, more light will be transmitted to the light sensitive element 47 and the reading on the ammeter 56 will change in one direction. However, when the material in the space 34 is oil, the amount of light transmitted to the light sensitive element 47 will be less and the reading on the ammeter 56 will change in an opposite direction to that when the water was present in the space 34.

In performing this step of my invention the body 30 is lowered predetermined distances and readings are taken when the body is in a stationary position. The length of the cable is measured, and therefore the operator will know the depth at which readings are being taken. If desired, the device may be lowered continuously and readings taken while the device is in motion. By listing the various readings which are taken at the different depths it is possible to plot a curve which will indicate to the operator the depths at which the water and also the depths at which the oil are entering the well. In Fig. 4 such a chart is illustrated. On this chart the line 60 has been plotted by readings taken at different depths in the well by the apparatus disclosed in Figs. 1 and 2. The chart illustrates that the portion of the well where the oil and water enter the well. Where there is no entrance of either water or oil into the well the line 60 remains at zero. Where oil has entered the line forms a peak at the left, as indicated at 61, 62, and 63, and where water has entered the well there is a peak to the right, as indicated at 64. The normal or zero portions of the line 60 between the peaks 61, 62, and 64, as indicated at the points 66 and 67, indicate the point at which there has been no leakage of liquid into the well and will signify the presence of shale or some other non-productive formation.

By the process just performed it is possible to very accurately locate the point at which water enters the well, which is the information usually desired in making such a test of a well. However, as is quite apparent from the foregoing description and from the chart in Fig. 4, it is also possible to know the points at which the oil is entering the well.

In Fig. 3 I have illustrated an alternative form of my invention which involves a different method of transferring the readings to the surface of the ground. In the form of my invention disclosed in Figs. 1 and 2 the method of transferring the readings to the surface of the ground is an electrical method which involves the conductors 48 and 49. In the method disclosed in Fig. 3 the readings are transferred by radio apparatus. The light sensitive element 47 is connected by conductors 70 and 71 to a radio sending device 72 which is mounted directly in the upper shell 31, and which has a suitable antenna 73. At the surface of the ground there is a radio receiving apparatus 74 having a suitable receiving antenna 75 and which incorporates means for changing the radio energy into electrical energy so that a reading may be obtained on an ammeter 76 which is connected to the apparatus 74 by conductors 77 and 78. In this form of the invention the cable 50 need not contain any conductors, since its sole purpose and function is to support the weight of the body 30 in order that it may be raised and lowered.

It is also possible to record the readings on photographic film which may be mounted in the upper shell 31, and to develop this film and obtain the readings after the apparatus has been elevated to the surface of the ground. Various mechanisms for intermittently advancing film at predetermined periods are well known in various industries and need not be described in detail herein.

In the form of device shown in Fig. 5 I employ a body 30 comprising upper and lower shells 31 and 32 with a diagonal passage 34 therebetween. In the lower shell I place a heat generating element 41' which may consist of a lamp, which, when energized by current from a battery 43 will form a source of vibratory energy a material portion of which is in the range of infra-red. In the aperture 36 I may place an infra-red filter 80 so that the beam of rays directed by the reflector 42 out through the aperture 36 and the lens 37 toward the upper aperture 38 will consist of infra-red rays. In the upper shell 31 of the body 30 I place a cell 47' which is sensitive to vibration lying in the range of heat rays, or in this particular instance in the range of infra-red, this cell 47' being connected into the circuit comprising the conductors 48 and 49, which, as shown in Fig. 1, extends up through the cable 50 to suitable electrical recording or indicating instruments shown simply as consisting of an ammeter 56 and a voltmeter 57. In this form of the invention the operation is essentially as described relative to Fig. 1, the exception being that the rays which pass through the liquid in the diagonal passage 34 and through the upper lens 39 and the aperture 38 to the cell 47' comprise vibratory energy of the general character of light, but lying in another band of vibration, namely, that of heat.

In the variation of the invention disclosed in Fig. 6 I provide a body 30 having upper and lower sections 31 and 32 disposed in spaced relation so as to provide a passage 34. On one side of this passage 34 I place a sound transmitting element 81 and on the other side thereof I place a sound receiving element 82. The sound transmitting element 81 may consist of an electrical means for producing sound vibrations, such as employed in the receiver of a telephone. For example, it may comprise an iron disc 83 peripherally supported so as to be vibrated by magnetic flux produced by electromagnet 85 intermittently energized from a battery 86 through a circuit comprising conductors 87 and 88, one of which is provided with a circuit breaker comprising an electrically actuated buzzer 90 of well known form including an electromagnet 91 connected in series with the battery 86 and having an armature 92 which vibrates so as to actuate the circuit breaker 89, the same being tuned or adjusted so as to produce the desired periodicity of electrical pulsations through the circuit 87—88 including the electromagnet 85.

On the other side of the passage 34 of Fig. 6 I place a sound receiving element 82 which may comprise a diaphragm 93 made of a magnetic metal, such as iron, serving as an external field element in conjunction with electromagnet 94 connected in series through conductors 95 and 96 with an amplifier 97. The amplified output from the amplifier 97 is carried to the surface of the ground through a circuit comprising a conductor 100 which connects to the conductor 101 of the supporting cable 50, and a conductor 102 which is grounded with the shell 31 so as to be connected to the sheath 103 of the cable 50. Since the metal discs 83 and 93 must be relatively thin and therefore incapable of withstanding any large pressure, I support these discs 83 and 93 in such manner that the pressure on opposite sides thereof will be constantly equalized or balanced. In the instance of each diaphragm 83 and 93, this is accomplished by supporting the disc in a ring 105 carried at the forward end of a chamber having a yieldable wall so that the internal pressure applied to the inner face of the diaphragm will be always substantially equal to the pressure existing in the passage 34. Such chamber is preferably formed by use of a corrugated metal tube 107 which has its outer end connected to a ring 105 and its inner end connected to a ring 108 secured in an opening 109 in either shell 31 or 32. Each ring 108 carries a wall of insulating material 110 which closes the inner end of the associated chamber so that such chamber may be filled with a dielectric fluid, such as transformer oil. The insulating walls 110 carry therein transverse bushings 112 which enter into the formation of the conductors 87, 88, 95, and 96 so that the required circuits may be carried into the chambers 106 to the electromagnets 85 and 94. In this third form of the invention the sound vibrations set up at one side of the passage 34 by the vibration of the disc 83 are transmitted through the fluid or liquid occupying the passage 34 and at least a portion of such vibrations are picked up by the diaphragm 93, the resultant vibration of which produces corresponding fluctuations in the current passing through the windings of the electromagnet 94.

Although I have shown the amplifier 97 situated within the shell 31, it will be understood that the amplifier may be situated adjacent the top of the well and that the conductors 100 and 102 may be carried to the top of the well through the cable 50.

In the appended claims I will use broad terms in defining my invention and do not wish to be limited to any specific details illustrated herein. I believe my invention to be broadly new in a process which includes the transmitting of vibrations or waves through a body of material in a well, receiving the vibrations or waves which have been transmitted from such body of material from the well, and recording the vibrations or waves which have thus been received. In the preferred form of my invention the vibrations or waves which are transmitted are light vibrations but may also be heat or sound vibrations.

I claim as my invention:

1. In a method of determining points of entrance of a fluid into a well, the steps of: distributing a charging material of predetermined light transmitting qualities in a selected portion of said well; causing a leakage of fluid into said well to occur; and determining the light transmitting qualities of the material at spaced points along said selected portion of said well.

2. In a method of determining points of entrance of a fluid into a well, the steps of: preparing the well by giving the fluid therein known light transmitting qualities; causing a leakage of fluid into said well to occur; and determining the light transmitting qualities of the material within said well by passing light through successive portions of said material in said well and measuring the light which passes through such successive portions of the material in the well.

3. In a method of determining points of entrance of a fluid into a well, the steps of: placing a charging material having known light transmitting qualities in said well; causing a leakage of fluid into said well to occur; and determining the light transmitting qualities of the material within said well.

4. In a method of determining points of entrance of a fluid into a well, the steps of: placing a charging material having known light transmitting qualities in a selected portion of said well; causing a leakage of fluid into said well to occur; placing a light source in said selected portion of said well; placing a light sensitive element in said well adjacent to said light source; and measuring the intensity of the light transmitted from said light source to said light sensitive element.

5. In a method of determining points of entrance of a fluid into a well, the steps of: placing a charging material having known vibration transmitting qualities in a selected portion of said well; causing a leakage of fluid into said well to occur; placing a vibration source in said selected portion of said well; placing a vibration sensitive element in said well adjacent to said vibration source; and measuring the intensity of the vibration transmitted from said vibration source to said vibration sensitive element.

6. In a method of determining points of entrance of a fluid into a well, the steps of: preparing a selected portion of the well by giving the fluid therein known wave transmitting qualities; causing a leakage of fluid into said well to occur; placing a wave propagating source in said selected portion of said well; placing a wave sensitive element in said well in spaced relation to said wave source; and measuring the intensity of the waves transmitted from said wave propagation source to said vibration sensitive element through the fluid in the space between said source and said element.

7. An apparatus for detecting water intrusion in a bore hole comprising a casing, a photo-electric cell transversely mounted in said casing, a source of light in said casing, an open passageway passing through said casing between said source of light and said photo-electric cell, the passageway opening on one side being at a lower level than that on the other to insure freedom of flow through said passageway as the casing is lowered into the bore hole, means for raising and lowering said casing assembly in a bore hole filled with liquid, an ammeter on the surface of the earth and leads electrically connecting said photo-electric cell to said ammeter.

8. In a method of locating the stratum through which water enters a bore hole, the steps of producing a relatively opaque and uniform light transmitting quality to the liquid in the bore hole, withdrawing sufficient of said liquid to permit the entrance of water from the water bearing stratum into said bore hole, measuring the light transmitting quality of said liquid in the bore hole at successive known levels, the stratum through which the entry of water is taking place being indicated by the difference in the light transmitting quality of the liquid in said area.

9. An apparatus for detecting water intrusion in a bore hole comprising a casing, a photo-electric cell transversely mounted in said casing, a source of light in said casing, walls provided by said casing forming a passageway between said photo-electric cell and said source of light, at least one end of said passageway being so communicated with the interior of the bore hole as to promote freedom of flow through said passageway as said casing is moved longitudinally in the bore hole, means for raising and lowering said casing assembly in a bore hole filled with liquid, an ammeter on the surface of the earth and leads electrically connecting said photo-electric cell to said ammeter.

10. In a method of locating the stratum through which water enters a bore hole, the steps of producing a light transmitting quality which is different from that of the water which leaks into the bore hole to the liquid in the bore hole, withdrawing sufficient of said liquid to permit the entrance of water from the water bearing stratum into said bore hole, measuring the light transmitting quality of said liquid in the bore hole at successive known levels, the stratum through which the entry of water is taking place being indicated by the difference in the light transmitting quality of the liquid in said area.

11. In a method of determining the point at which connate fluid enters a well, the steps of: conditioning the portion of the well desired to be tested so that it will contain a conditioned fluid having light transmitting qualities which are different from those of said connate fluid; causing said connate fluid to enter the well so as to change the light transmitting qualities of said conditioned fluid; and determining the light transmitting qualities of consecutive portions of said conditioned fluid.

GEORGE H. ENNIS.